United States Patent
Ostrovskii (10) Patent No.: US 11,927,705 B2
(45) Date of Patent: Mar. 12, 2024

(54) APPARATUS AND METHODS FOR DETECTING MASSIVE PARTICLES, LOCATING THEIR SOURCES AND HARVESTING THEIR ENERGY

(71) Applicant: Igor Ostrovskii, Oxford, MS (US)

(72) Inventor: Igor Ostrovskii, Oxford, MS (US)

(*) Notice: Subject to any disclaimer, the term of this patent is extended or adjusted under 35 U.S.C. 154(b) by 241 days.

(21) Appl. No.: 17/454,476

(22) Filed: Nov. 10, 2021

(65) Prior Publication Data

US 2023/0148176 A1 May 11, 2023

(51) Int. Cl.
G01T 1/00 (2006.01)
G01T 1/16 (2006.01)
H02J 50/00 (2016.01)

(52) U.S. Cl.
CPC .......... G01T 1/1606 (2013.01); G01T 1/1603 (2013.01); H02J 50/001 (2020.01)

(58) Field of Classification Search
CPC ....... G01T 1/1606; G01T 1/1603; G01T 1/00; H02J 50/001
See application file for complete search history.

(56) References Cited

PUBLICATIONS

Igor "Direct detection of gravitating dark particles navitens by nonlinear effects in crystal vibrations and by particles track", Acoustical Society of America, Proceedings of Meetings on Acoustics, vol. 36, 045006, 2019, p. 1-11. (Year: 2019).*
1. Constantin "Optimization of the thermal noise in multi-loop pendulum suspensions for use in interferometric gravitational wave detectors"; LIGO Project, California Institute of Technology, Pasadena, Sep. 8, 1999, p. 1-12. (Year: 1999).*
Masataka et al. "Detection of gravitational waves II", Proceedings of the 4-th International Colloquium "Mathematics in Engineering and Numerical Physics", Balkan Society of Geometers, Geometry Balkan Press 2007, p. 120-125 (Year: 2007).*

* cited by examiner

*Primary Examiner* — David P Porta
*Assistant Examiner* — Mamadou Faye
(74) *Attorney, Agent, or Firm* — Chen-Chi Lin (57) ABSTRACT

The invention detects massive particles, which are invisible to contemporary particle detectors employing electro-magnetic sensors. The apparatus contains a mechanical sensor detecting massive particles via their influence on mechanical motion of sensor constituent atoms causing changes in sensor characteristics. The apparatus may include said sensor made of crystal or condensed-matter attached as a bob at the end of a pendulum that starts swinging when massive particles hit it. The star-source emitting massive particles is located by finding a space direction from which the particles arrive and produce the changes in said sensor position and physical characteristics. Energy is harvested by using changes in sensor energetic characteristics including mechanical motion, electromagnetic potential, thermal or other reactions. The invented sensor has directly detected massive particles from the Sun, central region of our Galaxy, and the star Deneb. The average mass-energy of solar massive particles is $3.1_{-1}^{+1.2} \times 10^{15}$ eV and mass-energy density near Earth ~0.78 GeV/cm$^3$.

8 Claims, 6 Drawing Sheets

APPARATUS AND METHODS FOR DETECTING MASSIVE PARTICLES, LOCATING THEIR SOURCES AND HARVESTING THEIR ENERGY

CROSS-REFERENCE TO RELATED APPLICATIONS

"Not Applicable"

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC

"Not Applicable"

BACKGROUND OF THE INVENTION

(1) Field of the Invention

The invention pertains to solid-state devices including vibrators, oscillators, pendulums, electric conductors and their usage in the sensors of external physical factors and, more specifically, to detectors of small masses and particles.

The invention is devoted to the detection of natural massive particles, which may be part of so-called cosmic rays emitted by stars, or solar "wind" emitted by the Sun. The word massive indicates that a particle has a rest mass, in contrast to photons with zero rest mass or neutrinos with close to zero rest mass. The cosmic rays consist of different particles and electromagnetic radiation, which enter Earth's atmosphere. The so-called visible or luminous matter may be detected by contemporary astronomical and high-energy-physics instruments that usually employ optical and electromagnetic sensors, which operate with the photons of different energy, electro-magnetic waves of different wavelengths, and electric currents or potentials due to electrically charged particles.

(2) Description of the Related Art

The Parker Solar Probe (PSP) launched by NASA measures the near-Sun solar wind of electrically charged particles (J. Kasper, et al., Nature 576, 228-231 (2019)), fine structure of the solar corona (Howard, R., et al., Nature 576, 232-236 (2019)), slow solar wind (S. Bale, et al., Nature 576, 237-242 (2019)), and energetic charged particles emitted by the Sun (D. McComas, et al., Nature 576, 223-227 (2019)). The magnetic fields, electrons, protons and ions of some elements were also detected using PSP. The detectors in the above-mentioned investigations employed an interaction between solar emissions and electromagnetic-type sensors.

However, the Sun and other stars may emit massive particles of much higher mass-energy than those already detected including those that do not demonstrate electromagnetic interaction. The existence of natural particles heavier than the protons or neutrons is proven by experimentally observed energy spectra of cosmic rays (A. Corstanje, et al., Phys. Rev. D 103, 102006 (2021)), and by detection of high-energy neutrinos in the Ice-Cube collaboration experiments (M. G. Aartsen, et al., Eur. Phys. J. C 78, 831 (2018)).

Figure 1A:
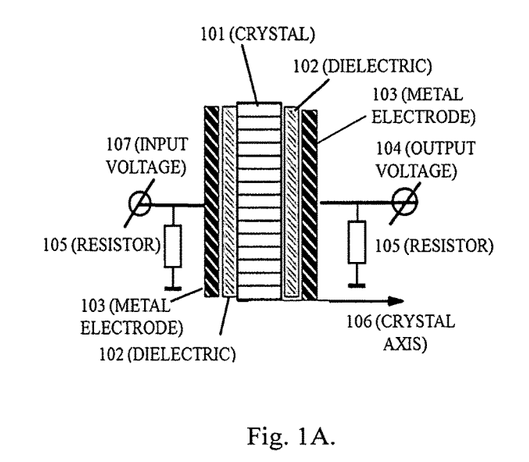
FIG. 1A. Previous art with fixed crystal 101 between the two dielectric films 102.
Figure 1B:
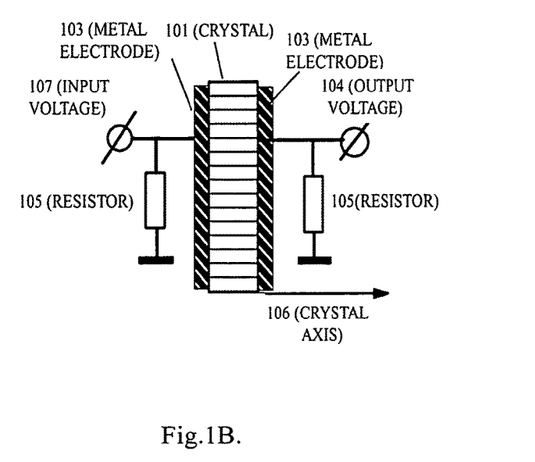
FIG. 1B. Previous art with fixed crystal 101 without dielectric films 102.

Recently, a crystal-star effect has been reported in Igor Ostrovskii, Proceedings of Meetings on Acoustics, 34, 045007 (2018) (hereinafter "Ostrovskii (2018)"). In one prior art, the direct detection of cosmic dark radiation is disclosed in Ostrovskii (2018). The word dark indicates that these particles are invisible to electromagnetic sensors employed in contemporary astronomical and high-energy-physics instruments, and consequently are not yet known. This art is shown in FIG. 1A, where quartz crystal 101 is the sensor of cosmic radiation. It operates due to interaction of massive particles with crystal 101 being under ultrasonic excitation by input voltage 107. The output voltage 104 may be altered owing to the influence of massive particles on 101. Direct detection of gravitating massive particles was disclosed in Igor Ostrovskii, Proceedings of Meetings on Acoustics, 36, 045006 (2019) (hereinafter "Ostrovskii (2019)"). This previous art is shown in FIG. 1B, where dielectric films 102 are absent and crystal 101 is coated with metal electrodes 103 to increase the ultrasound amplitude in 101. It allows the recording of nonlinear phenomena in a dependency of output voltage 104 versus the frequency of voltage 107. The nonlinear effects in 104 appeared when the massive particles hits 101 under ultrasonic excitation.

Both the arts shown in FIG. 1A and FIG. 1B require externally excited ultrasonic oscillations inside 101, which makes sensor 101 depend on the external voltage 107 and ultrasound in 101. This may result in errors in the detection of massive particles because sensor 101 is under ultrasonic excitation and may not be sensitive to individual particles. To solve this problem, it is necessary to eliminate the externally excited ultrasound in 101.

German Pat. No: DE102013006563A1 discloses theoretical method and apparatus for direct detection of dark matter by antimatter and their annihilation with the elementary particles of dark matter. This theoretical idea is based on possible interaction of not known dark matter particles with another not known particles of antimatter.

U.S. Pat. No. 5,083,028A discloses a neutron detector constituted by two identical diodes and a special cover for one diode that convert neutrons into charged particles.

U.S. Publication No: 2005/0017185A1 discloses a radiation detector of low energy neutrons. It is using a neutron capture material and sensing element having an electrical characteristic which changes in the presence of charged particles or electromagnetic radiation.

U.S. Pat. No. 8,338,784B2 discloses a radiation detector in which a semiconductor or insulator single crystal serves as a radiation absorber. In this patent the electric properties of semiconductor parts are changed under energy ray action. The term radiation means electromagnetic waves and charged particles.

U.S. Pat. No. 8,536,527B2 discloses a method for sensing a volume exposed to charged particles. This patent and patent EP1944626A2 disclose the radiation imaging detectors operating with optical depictions generated by incoming charged particles or a radio-active source.

U.S. Publication No: 2013/0015360A1 discloses a radiation detector with a scintillator structure having an optical waveguiding property. U.S. Pat. No. 4,421,985A discloses a dark field infrared telescope based on an optical sensor.

European Pat. No: EP0228933A1 discloses a device for detecting and locating electromagnetic radiation or neutrons by using an enclosure filled with gas, in which a converter capable, under the impact of neutral particles, of emitting ionizing particles producing ionization of the gas. This art is a modified type of well-known Geiger tube.

U.S. Pat. No. 5,043,574 discloses an apparatus for sensing direction of a neutral particle beam emitted by an accelerator along a predetermined axis in a magnetic field. The detection system includes a lens and a pixel array located in the focal plane of the lens for detecting a selected number of photons.

(3) Problems Involved in the Prior Art which are Solved by the Invention

The main existing problems in the two previous art shown in FIG. 1A and FIG. 1B are their dependency on externally excited ultrasound in 101, which interferes with the effect of incoming massive particles that does not allow unmistakable conclusions on said particle detection. The patented arts mentioned above, (2), disclose radiation detectors for electromagnetic waves or subatomic particles. The main existing problems in patented arts consist in their detectors based on the electromagnetic interactions or transformations with incoming subatomic particles. Such detectors cannot detect massive particles that do not demonstrate the electromagnetic interactions and may be much heavier than subatomic particles.

BRIEF SUMMARY OF THE INVENTION

(1) The Advantages of the Invention

The invention solves problems previously existent in the prior art of detecting massive particles that do not have electro-magnetic interaction with a detector, and may be much heavier than subatomic particles.

(2) The Nature and Gist of the Invention

The essence of the invention is innovative mechanical sensor, in which massive particles propagating through said sensor influence on mechanical motion of sensor constituent atoms.

(3) Disclosure of the Best Mode for Invented Sensor

The apparatus may include a crystalline sensor suspended as a bob at the end of a pendulum that starts swinging when massive particle hits it, or be a part of any oscillator or vibrator. And then said particle is detected by detecting changes in sensor physical position, while it is swinging, and/or by detecting changes in sensor physical or chemical properties or characteristics.

(4) Statement of the Object of the Invention

The invention allows the detection of massive stellar particles, which are invisible to all of the electromagnetic sensors usually employed in particle detectors. These particles may be invisible or dark parts of so-called cosmic rays emitted by the stars. An apparatus for detecting massive particles, locating their sources, and harvesting their energy comprises a mechanical sensor, which may be made of crystal, condensed matter, ceramic, or multilayer system. The apparatus may include said sensor disclosed in (3).

The star-source emitting massive particles is located by finding the space direction from which the particles arrive and produce changes in the said sensor. Energy is harvested using sensor energetic characteristics including mechanical motion, electromagnetic potential, and thermal or nuclear reactions.

The invented sensor has directly detected massive particles from the Sun, central region of our Galaxy, and star Deneb. The average mass-energy of solar massive particles is $3.1 \times 10^{15}$ eV and mass-energy density near Earth~0.78 GeV/cm$^3$.

(5) The Figures and Examples

The Figures and Examples demonstrate the validity of the Invention and Claims, its embodiments, the best mode of practical operation, and application for the characterization of detected stellar massive particles.

Figure 5A:
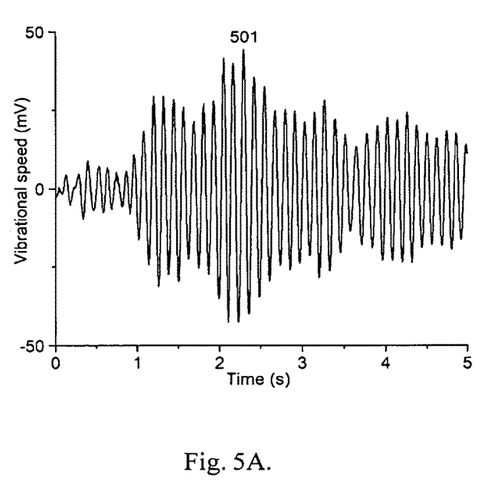
FIG. 5A. Time waveform detected from swinging quartz 32QXM7; while it is hit by solar massive particles.
Figure 5B:
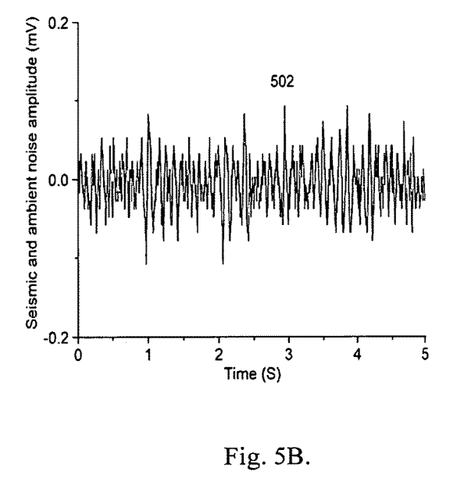
FIG. 5B. The seismic and ambient noise waveform 502 detected by noise sensor 207 simultaneously with 501.

Example 1 and FIG. 5A, FIG. 5B evidence that vibrations of the invented mechanical sensor suspended as a bob at the end of a pendulum cannot be explained by seismic and ambient noises.

Figure 6A:
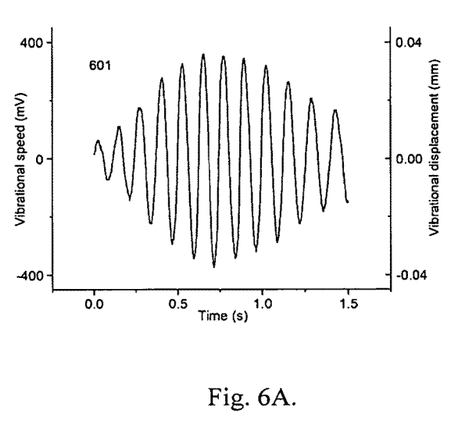
FIG. 6A. Time waveform detected from swinging quartz 28QAT6; while it is hit by solar massive particles.
Figure 6B:
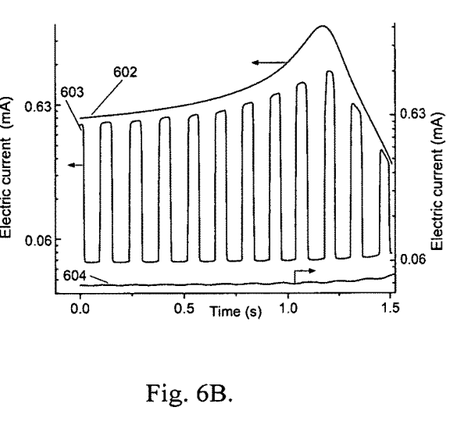
FIG. 6B. MHz-range electric current through swinging quartz 28QAT6; while it is hit by solar massive particles.

Example 2 and FIG. 6A, FIG. 6B prove that massive particles detected by invented mechanical sensor put sensor atoms into mechanical oscillating motion.

Figure 7A:
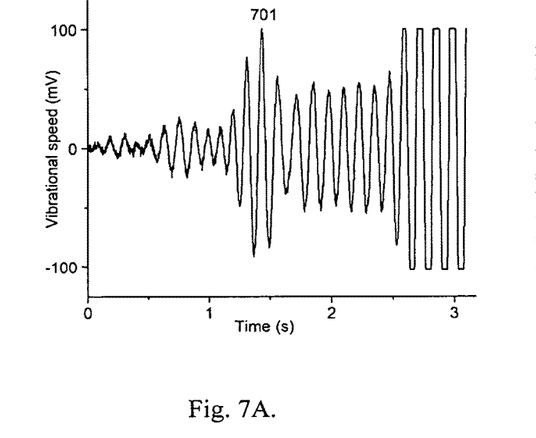
FIG. 7A. Time waveform 701 detected from swinging quartz 32QM7; while it is hit by solar massive particles.
Figure 7B:
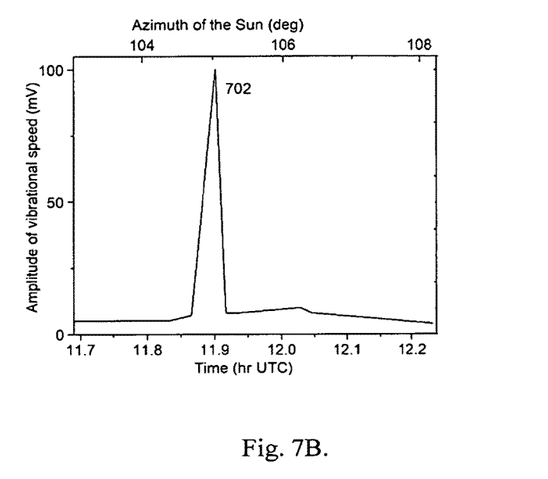
FIG. 7B. Plot 702 is a time dependency of an amplitude of waveform 701.

Example 3 and FIG. 7A, FIG. 7B validate a method of locating azimuth/direction to a source of massive particles detected by the invented mechanical sensor suspended as a bob at the end of a pendulum in accordance with a disclosure of the best mode for invented sensor.

Figure 8A:
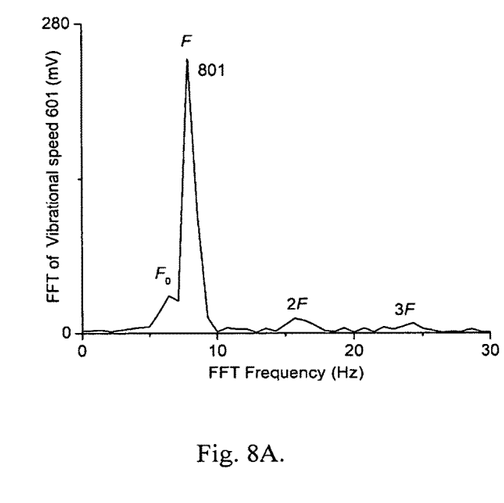
FIG. 8A. Fast Fourier transform spectrum 801 obtained from the time dependent vibration waveform 601. The 801 reveals natural resonance frequency $F_0$ and driven frequency Fin 601.
Figure 8B:
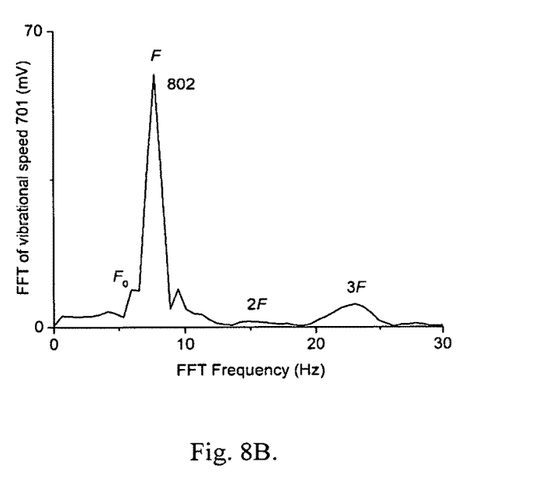
FIG. 8B. Fast Fourier transform spectrum 802 obtained from the time dependent vibration waveform 701. The 802 reveals natural resonance frequencies $F_0$ and driven frequencies F in 701.

Example 4 and FIG. 8A, FIG. 8B present a practical application of the invention for characterization of massive particles emitted by the Sun by finding their mass and their mass-energy density near Earth.

Example 5 and FIG. 9A, FIG. 9B, FIG. 9C, FIG. 9D demonstrate that massive particles may be produced and emitted by the Sun.

Figure 10A:
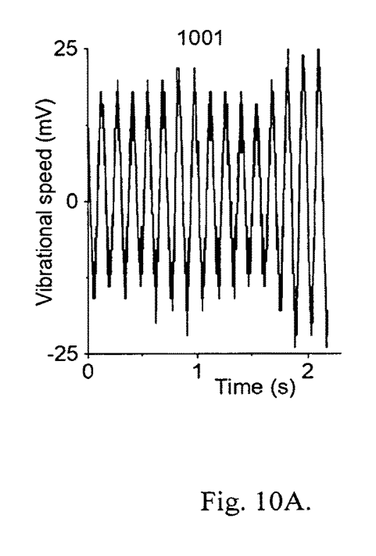
FIG. 10A. Time waveform 1001 detected from swinging quartz 28QAT6; while it is hit by massive particles from the central region of our Milky Way Galaxy.
Figure 10B:
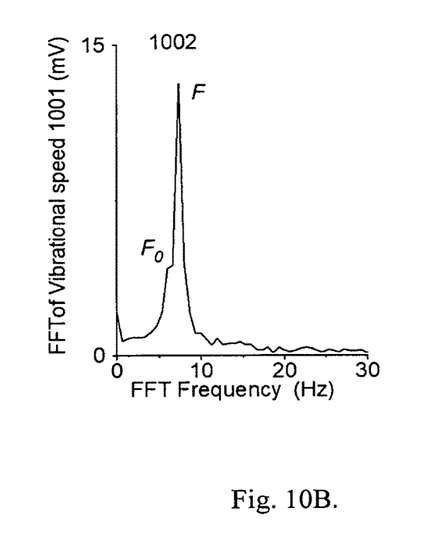
FIG. 10B. Fast Fourier transform spectrum 1002, obtained from the time waveform 1001, reveals the main driven vibrational frequency of F=7.3 Hz in 1001.

Example 6 and FIG. 10A, FIG. 10B demonstrate the direct detection of massive stellar particles from the central region of our Milky Way Galaxy by using invented mechanical sensor suspended as a bob at the end of a pendulum.

Figure 11A:
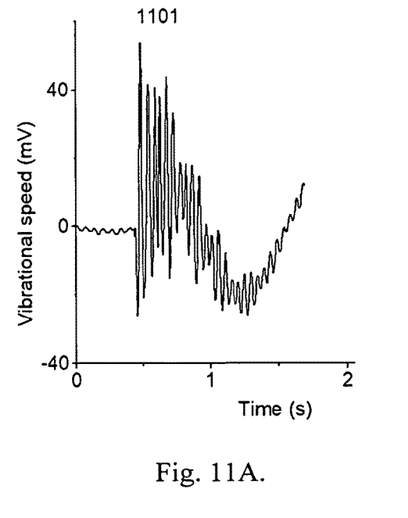
FIG. 11A. Time waveform 1101 detected from swinging quartz 28QAT1; while it is hit by massive particles from the star Deneb in the constellation Cygnus.
Figure 11B:
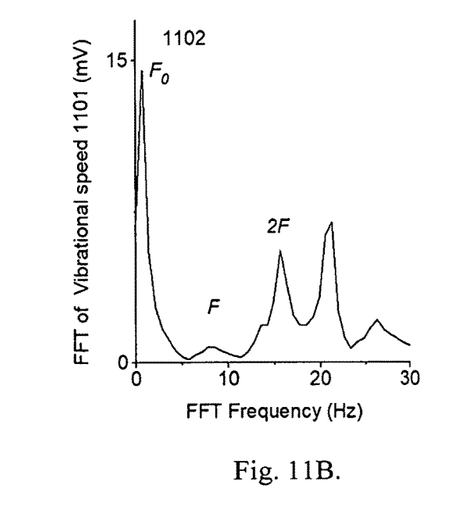
FIG. 11B. Fast Fourier transform spectrum 1102, obtained from the time waveform 1101, reveals the main driven vibrational frequency of F=7.8 Hz in 1101.

Example 7 and FIG. 11A, FIG. 11B demonstrate the direct detection of massive stellar particles from the star Deneb in the constellation Cygnus by using invented mechanical sensor suspended as a bob at the end of a pendulum.

DETAILED DESCRIPTION OF THE INVENTION

In the description to follow, like reference numbers are used to identify like elements.

(1) A description of the preferred embodiments of the invented mechanical sensor: The embodiment of the invented mechanical sensor 201 is presented in FIG. 2, where it is suspended in its housing 202.

Figure 2:
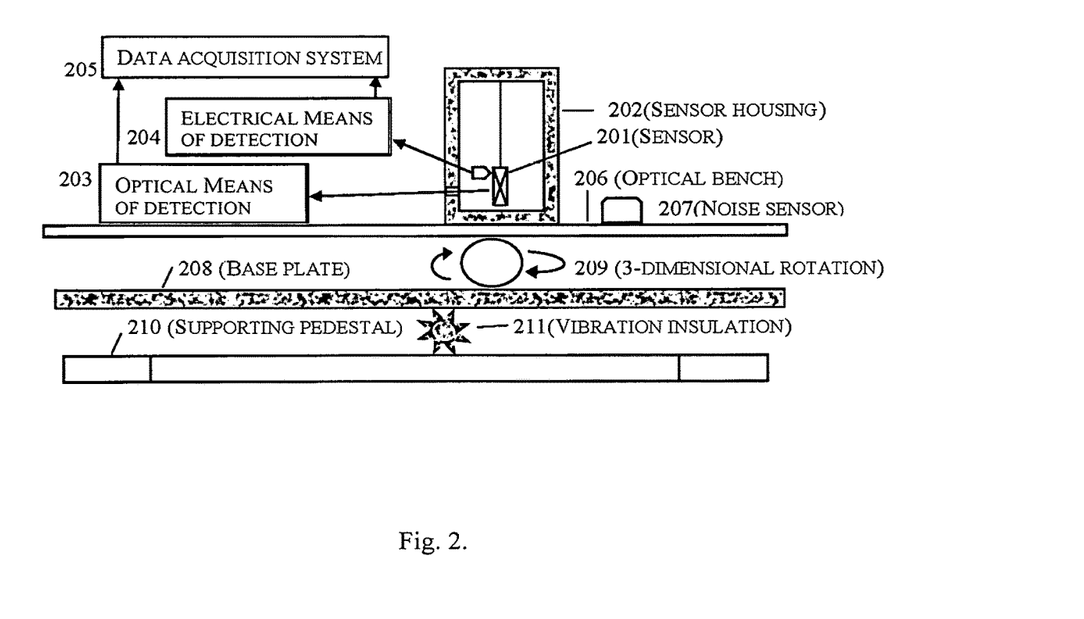
FIG. 2. The embodiment of an apparatus for detecting massive stellar particles, locating their sources and harvesting their energy.

(2) A description of the preferred embodiments of the invented apparatus: FIG. 2 shows an embodiment of an apparatus for detecting massive stellar particles, locating their sources and harvesting their energy with the help of a sensor 201 in its housing 202, which is installed on optical bench 206, as shown in FIG. 2. The registration means 203, 204, 205 detect said particles by detecting changes in the physical characteristics and position of sensor 201. The noise sensor 207 detects the seismic and ambient noises. The optical bench 206 may be orientated in three dimensions by 3-dimensional rotation fixture 209 connected to a fixed base plate 208, which is installed on a supporting pedestal 210 through vibration insulation 211.

Figure 3:
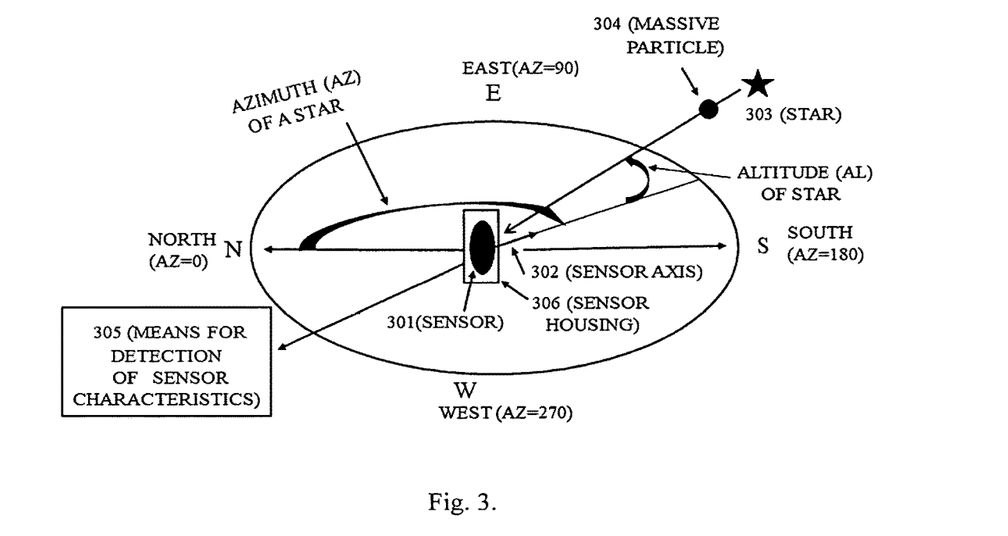
FIG. 3. The schematic diagram of the method for detecting stellar particles and locating their sources.

(3) A description of the preferred embodiments and the mode of operation of the invented method for detecting massive particles and locating their sources: The registration means 203, 204, and 205 detect said particles by detecting changes in the physical characteristics and position of sensor 201. The noise sensor 207 detects the seismic and ambient noises. The optical bench 206 may be orientated in three dimensions by a 3-dimensional rotation fixture 209, FIG. 2. It is connected to a fixed base plate 208, FIG. 2, which is installed on a supporting pedestal 210 through a vibration insulation 211, FIG. 2. The FIG. 3 shows a schematic diagram of the method for detecting massive stellar particles and locating their sources. The sensor 301 is oriented in space by setting its axis 302 at variable azimuth (AZ) and altitude (AL), as presented in FIG. 3. The detection means 305 detect the changes in characteristics of 301 including deviations of the position of sensor 301 in its housing 306, and changes in physical characteristics counting optical, electrical, electromagnetic, acoustical, mechanical, high-energy or particle physics, nuclear physics, thermal, or any combination of the physical characteristics. The changes in said characteristics of 301 are detected by 305 when massive particle 304 emitted by 303 hits 301; and in this way 304 is detected. The space direction of 302 given by its AZ, AL reveals sky location of star 303 that emitted particle 304. The search and locating 303 is completed by varying AZ and AL of 302, as disclosed in the FIG. 3, together with detecting changes in the above-mentioned characteristics of 301.

Figure 4:
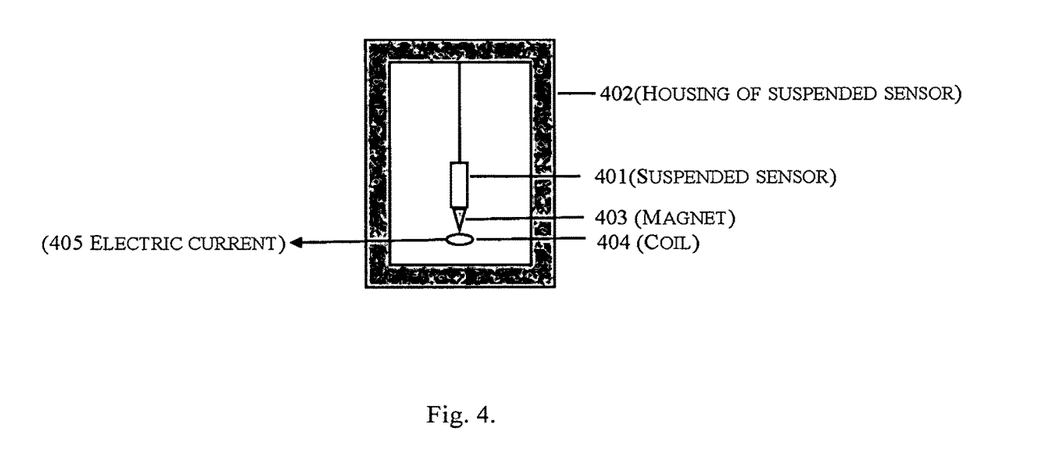
FIG. 4. The schematic diagram of a method for energy harvesting from massive particles.

(4) A description of the preferred embodiments and the mode of operation of the invented method for energy harvesting from massive particles: FIG. 4 shows a schematic diagram of a method for energy harvesting from massive particles by using energy of the mechanical motion of a suspended sensor 401 in its housing 402, with an attached magnet 403. The magnet 403 vibrates along with 401 over an electric coil 404, and then a variable magnetic field near the tip of 403 penetrates electrical coil 404 generating an electric current 405. The electric current 405 occurred when particles 304 hit sensor 401 and activated a swinging motion of 401 with 403 over coil 404.

(5) The best mode contemplated by the inventor of carrying out his invention: The best mode of a practical usage of the invention includes three parts: 1) The best mode for invented sensor. It may be made of a crystalline media, and be suspended as a bob at the end of a pendulum, FIG. 2. It will be swinging when a massive particle hits it, and causes changes in sensor position and its physical characteristics. 2) The preferred embodiment and the mode of operation of the invented method presented in FIG. 3. 3) The use of optical, 204, and/or electrical, 205, means of detection of the changes in the characteristics of a swinging sensor 201, as disclosed in FIG. 2.

(6) The Examples for clarification and verification of the present invention: The Examples below are included to provide additional explanations for a more systematic clarification of the present invention. In order to provide a more thorough formulation of the invention, reference is made to the following non-limiting examples. To verify the feasibility and performance of an apparatus for detecting massive stellar particles and locating their sources, in the examples that follow, the sensors are made of crystalline quartz plates or disks of milligram range weight available on the market place. The sensor axis 302 in FIG. 3 is oriented along one of the crystallographic quartz axes, for example X-axis, Y-axis or rotated Y-axis.

Equipment used in the examples comprised a laser Doppler vibrometer Polytec PDV-100 (LDV) for optical means of detection, 203 in FIG. 2, spectrum analyzer Siglent SSA-3021 as electrical means of detection, 204 in FIG. 2, digital storage oscilloscopes Tektonics TBS2024B and Keysight DSOX-2012A along with computers for data acquisition system, 205 in FIG. 2, some small components and chemicals. The experimental errors of the method include calibration accuracy ±1% of LDV, spectrum analyzer and digital storage oscilloscopes accuracy of 1-5% depending on signal amplitude, and ±0.5 deg in setting crystal axis toward a star. The resultant signal-to-noise ratio was from near 10 to more than 100 in different examples below. The LDV gauges the vibrational speed S of the crystal-sensor 201/301 from 0.05 micrometer/s and higher over a frequency range from 0.05 Hz to 22 KHz. Its readings are specified in Volts used in some figures below, and 1 V corresponds to S=5 mm/s.

The LDV detected deviations in the physical position of sensor 201 in its housing 202. The pendulum vibrations of a suspended 201, FIG. 2, occur when particles 304 periodically hit sensor 201, and consequently 203 in FIG. 2 detects periodic changes in a position of 201, which is represented by a sinusoidal time waveform of sensor vibrational speed in the examples below.

The exact location in the sky of the Sun, the star Deneb and center region of our Galaxy is obtained with the astronomy software "TheSkyX Professional Edition" along with the calculated time of propagation, Tp=(Lse/Vp), needed for massive particles 304 to travel the distance Lse from the Sun to sensor 302 on Earth, FIG. 3. The speed Vp=249 km/sec (Ostrovskii (2018)). Then, solar time Ts for determining solar AZ, AL is Ts=(Te−Tp), where Te stands for a time of experiment on Earth. The distance Lse is changed every second due to not-circular orbit of Earth around the Sun, and therefore must be calculated for exact date and time Te of the experiment on Earth.

Example 1: This example demonstrates that vibrations of invented mechanical sensor suspended as a bob at the end of a pendulum, FIG. 2, cannot be explained by seismic and ambient noises.

The details of the invented mechanical sensor are schematically presented in FIG. 2, FIG. 3 and FIG. 4; where 202 is a sensor housing.

FIG. 5A demonstrates the detection of massive stellar particles 304 from the Sun by optical means of detection 203 LDV, FIG. 2. The LDV returned a time waveform 501 occurring when particles 304 hit 201/301. FIG. 5B presents the seismic and ambient noise waveform 502 detected by the noise sensor geophone 207, FIG. 2, simultaneously with the detection of 501. There is a significant difference between the time waveform 501 occurring due to particles 304 and noise the waveform 502 owing due to seismic and ambient noises. The plot 501 was is taken from the quartz sensor 32QXM; while Azimuth of axis 302 set to 240° coincides with Sun's AZ. This example evidences an important fact that the time waveform 501 occurs due to solar massive particles 304 and cannot be explained by the seismic and ambient noises.

Example 2: This example evidences that massive particles detected by the invented mechanical sensor disclosed in FIG. 2 put sensor atoms into mechanical oscillating motion, which allows sensor to be a part of any pendulum or oscillator.

The waveform 601 in FIG. 6A evidences a swinging oscillating motion of sensor 201, here quartz sample 28QAT6; while it detects massive stellar particles 304 emitted by the Sun, 303 in FIG. 3, with optical means of detection 203 LDV, indicated in FIG. 2 and returning plot 601 when particles 304 from the Sun are hitting 201/301; while Azimuth of axis 302 set to 204° coincides with Sun's AZ. FIG. 6B presents the detection of massive stellar particles 304 emitted by the Sun using electrical means of detection 204, plots 603, 604. Time waveform 601 becomes approximately zero-level noise in the absence of 304. Electrical means 204 detected the time dependency of the MHz-range electric current through sensor 201/301. The plot 602 is a smooth time dependency taken without particles 304 when axis 302 does not coincide with AZ angle of 303, FIG. 3. The pulse-type plot 603 is detected when particles 304 start hitting 201/301 as soon as axis 302 is approaching AZ toward 303 within ±1-degree difference from the AZ of 303. The low-amplitude plot 604 is detected when particles 304 hit 201/301 once axis 302 coincides with the AZ of 303. The plot 601 was taken from the quartz sensor 28QAT with axis 302 set at AZ 204° toward the Sun. The data in FIG. 6B were taken from the same sensor and the same axis 302 settings. However, the initial undistorted plot 602 is registered at 20 h: 55 min: 51 s UTC, when Sun AZ=191.8°, and does not coincide with axis 302 AZ=204° and then particles 304 do not hit 201/301. The plot 603 is taken later at 21 h: 13 m: 59 s UTC when Sun AZ=203.3°, that is 0.7° smaller than AZ of 302°. The plot 604 is taken at 21 h: 15 m: 52 s UTC when Sun AZ=204°=AZ of 302; then the maximum possible number of particles 304 hit sensor 201/301, and the amplitude of the initial plot 602 becomes very small. With time goes on, the alternating electric current through 301 restores from 604 to the initial plot 602, and plot 601 decreases to a near-zero noise.

The detection of time waveforms 601 and 604 occurs because massive particles 304 put sensor atoms into vibrational motion with low frequency F below 10 Hz, and consequently 201/301 starts swinging resulting in 601. However, high-frequency electric current of MHz range is not transmitted through dielectric quartz sensor 301 resulting in plot 604, because sensor atoms do not oscillate at high-frequency.

Example 3: This example validates a method of locating source of massive particles, FIG. 2 and FIG. 3, in accordance with a disclosure of the best mode of carrying out the invention.

The details of the invented apparatus and method of detecting massive particles, locating their source, and harvesting their energy are schematically presented in FIG. 2 and FIG. 3. The dimensions of 202, 203, 206, 207, 208, and 209 may vary, and are presented in FIG. 2 schematically to clearly show the details of the invented apparatus and method.

FIG. 7A presents a sinusoidal time waveform 701 taken from the swinging sensor 201/301, here quartz crystal 32QXM7, by 203, LDV; while 304 emitted by the Sun hit 301. Plot 702 in FIG. 7B shows the time dependency of the amplitude of waveform 701. The AZ of axis 302 was fixed in this experiment, and peak-type dependency 702 occurred because of the changing Sun's AZ due to Earth's rotation about its axis of rotation. The maximum of plot 702 in FIG. 7B was observed when AZ 302 coincided with that of the Sun, star-source 303. The data in FIG. 7A and FIG. 7B were taken with axis 302 set at AZ=105°. Plot 701 is taken at 11 h:54 m:06 s UTC when Sun's AZ is also 105°. Plot 702 is taken during time interval from 11 h:41 m:18 s to 12 h:13 m:56 s UTC, during which Sun's AZ is changes from less than 105° to more than 105°, upper X-axis in FIG. 7B. The maximum in 702 occurs under a 105° solar AZ when the maximum number of particles 304 hit sensor 301. The AL angle, as shown in FIG. 3, can be found in a manner similar to the AZ angle. This can be achieved by changing the AL angle of sensor axis 302, as shown in FIG. 3.

Example 4: This example presents a practical application of the invention for characterization of massive particles from the Sun by finding their mass M and their mass density D near Earth.

FIG. 8A presents a fast Fourier transform spectrum 801 of the vibration time waveform 601. Then FIG. 8B presents a fast Fourier transform spectrum 802 of the vibration time waveform 701. The plot 801 discloses two frequencies, $F_0=6.5$ Hz and F'=7.9 Hz, which compose waveform 601. The plot 802 discloses two frequencies, $F_0=6$ Hz and F=7.6 Hz which compose waveform 701. The vibrations of a driven pendulum have two main frequencies including a natural resonance $F_0$ and a driven frequency F=(1/T), with which an external periodic force of period T pushes said pendulum. (Fowels, G., Cassidy, G. *Analytical Mechanics*, 7th edn., Ch. 3. Thomson Brooks/Cole Publishing, (2005)). The force produced by massive particle 304 hits sensor 201/301, and is acting during time $\Delta T \approx 0.5$ T. The particle 304 of mass M interacts with pendulum-sensor 201/301 of mass m. Particle mass M can be calculated from the law of energy conservation, since a kinetic energy of 201/301 is equal to a kinetic energy transferred by 304 to 201/301, Equation (1), (Ostrovskii (2021)).

$$(M/m)=2\pi(S/V)^2[((F_0^2/F^2)-1)^2+(\gamma/\pi F)^2]^{1/2} \sin(\pi\Delta T/T-\varphi). \quad (1)$$

Where m, S, $F_0$, F are experimentally measured, $\gamma \ll \pi F$, $\sin(\pi\Delta T/T-\varphi) \approx 1$, and $V \approx 249$ km/s (Ostrovskii (2018)). In the case when the 3-dimensional sensor 201/301 cannot be considered as a point body, the mass M is replaced by sensor's moment of inertia with respect to a pivot line, and the linear speed S is replaced by an angular speed $(S/L_B)$ of the vibrating 201/301, where $L_B$ is a distance from the pivot point to laser beam position on a surface of 201/301, which may be in a center of sensor 201 indicated by arrow 302 in FIG. 3.

The calculations by Equation (1) with the data in FIG. 6A yield particle mass $M=7.54\times10^{-21}$ kg with known m=0.421 g and $F_0=6.5$ Hz, F=7.9 Hz, as in FIG. 8A. Similar calculations with the data in FIG. 7 give $M=6.34\times10^{-21}$ kg with known m=0.125 g, $F_0=6$ Hz and F=7.6 Hz, as in FIG. 8B. The average mass, Ma, of solar massive particle from multiple experiments is $Ma=5.5_{-1.7}^{+2.2}\times10^{-21}$ kg, and its average mass-energy $Wa=Ma\times C^2=3.1_{-1}^{+1.2}\times10^{15}$ eV. The average mass-energy density of solar massive particles near Earth (Da) can be calculated as $Da=(Wa\times F)/(A\times V)$, where A is an area of sensor 301 oriented toward the Sun. The calculations with typical F=7.7 Hz and used half-inch diameter sensor 301 give maximum $Da=(0.78$ GeV/cm$^3)$.

Example 5: This example reveals the fact of identical frequencies in the vibrational spectrum of the invented mechanical sensor due to solar massive particles and in the spectrum of solar magnetic field energy, which proves that massive particles may be produced and emitted by the Sun.

Time waveform 901 is taken at 14 h: 51 m: 58 s UTC from the quartz sensor 4QY7 with axis 302 set at 185° AZ while Sun's AZ was also 185° at a time when particles 304 were emitted. The spectrum 902, FIG. 9B, of waveform 901, FIG. 9A, reveals the driven frequency of vibrations F=5.9 Hz, natural resonance frequency $F_0=7.3$ Hz, and additional frequency $F_2=8$ Hz, which is not expected from the theory of driven pendulum vibrations (Fowels, Cassidy (2005)).

Figure 9A:
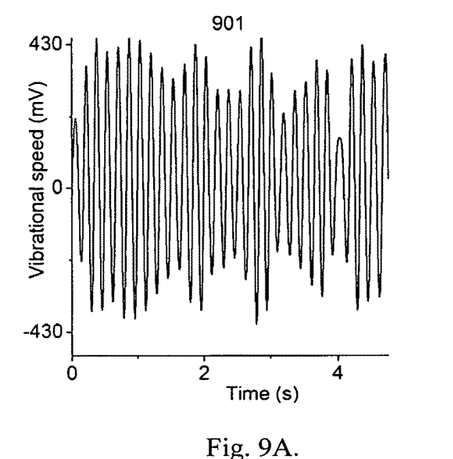
FIG. 9A. Time waveform 901 detected from swinging quartz 4QY7; while it is hit by solar massive particles.
Figure 9B:
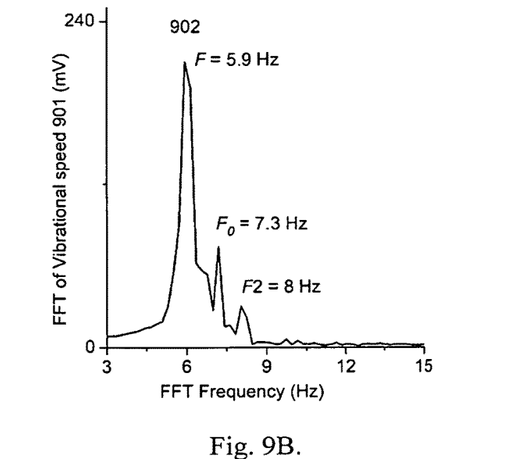
FIG. 9B. Fast Fourier transform spectrum 902, obtained from the time dependent vibration waveform 901, reveals the frequency components of F=5.9 Hz, $F_0$=7.3 Hz, and F2=8 Hz in 901.
Figure 9C:
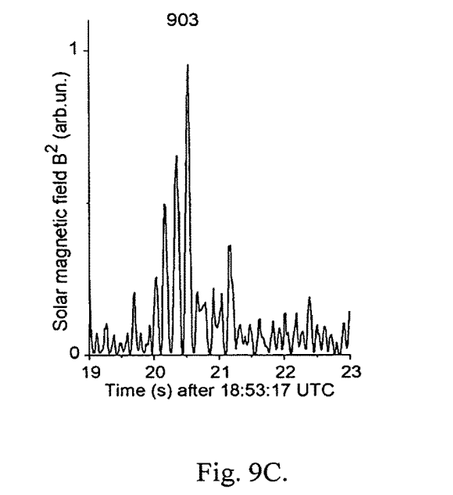
FIG. 9C. Time waveform 903 of a squared magnetic field ($B^2$) of the Sun at the time when particles 304 have been emitted by the Sun.
Figure 9D:
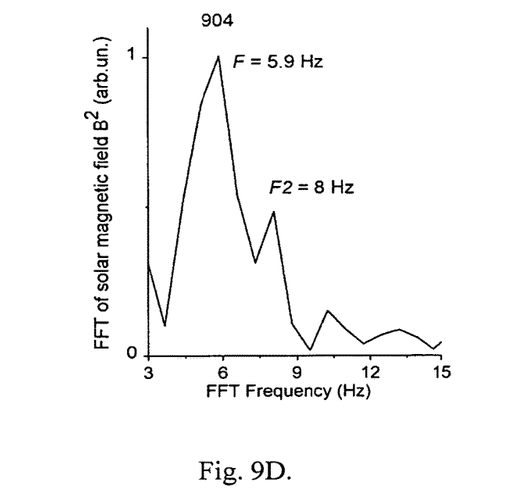
FIG. 9D. Fast Fourier transform spectrum 904, obtained from the time waveform 903 of a squared magnetic field of the Sun, reveals the frequency components of F=5.9 Hz and F2=8 Hz in 904.

The plot 903, FIG. 9C, is a time waveform of the squared solar magnetic field ($B^2$) proportional to solar magnetic energy, at the time when particles 304 have been emitted by the Sun. The components of solar magnetic field B are obtained by Parker Solar Probe launched by NASA; and they are available from the CDAWeb of the NASA Space Physics Data Facility (https://spdf.gsfc.nasa.gov). Spectrum 904, FIG. 9D, of waveform 903, FIG. 9C, also revealed two main frequencies: F=5.9 Hz and $F_{2=8}$ Hz. They coincide with the frequencies in FIG. 9B detected by the quartz sensor 301/201, FIG. 3/FIG. 2 correspondingly; while massive solar particles hit the sensor and activate its swinging.

Consequently, the spectral analysis shows the identical F and F2 in both waveforms 901 and 903, which allows us to conclude that massive particles hitting 201/301 were produced and emitted by the Sun.

Example 6: This example evidences direct detection of massive stellar particles from the central region of our Milky Way Galaxy by using invented mechanical sensor suspended as a bob at the end of a pendulum, as disclosed in FIG. 2.

FIG. 10A presents a time waveform 1001 demonstrating detection of massive particles from the central region of our Galaxy. The vibrational waveform 1001 is taken from sensor 201, FIG. 12A, by using LDV, 203 in FIG. 13F. Plot 1001 is captured from swinging quartz sensor 28QAT6 with $F_0=6.5$ Hz on 2019 Sep. 30 at 02 h: 37 m: 06 s UTC with axis 302 set at 224° AZ aimed on the Galactic center. The frequency components of time waveform 1001 are made known from its fast Fourier transform spectrum 1002. Main driven frequency F=7.3 Hz is below 10 Hz, the same frequency range as for solar massive particles discussed in Example 4.

Example 7: This example evidences direct detection of massive stellar particles from the star Deneb in the constellation Cygnus by using invented mechanical sensor suspended as a bob at the end of a pendulum, as disclosed in FIG. 2.

Time waveform 1101, FIG. 11A, demonstrates detection of massive particles arrived from the star Deneb in the constellation Cygnus. Plot 1101 is registered from swinging quartz sensor 28QAT1 with $F_0=0.8$ Hz on 2020 Jan. 8 at 04 h: 01 m: 12 s UTC with axis 302 set at AZ=326° coinciding with that of the star Deneb. The fast Fourier transform spectrum 1102 of the time waveform 1101 revealed first-order driven frequency F=7.8 Hz that is below 10 Hz, the same frequency range as for solar massive particles discussed in Example 4.

REFERENCES CITED

| Number | Date | Author(s) | Information | Examiner |
|---|---|---|---|---|
| U.S. PATENT DOCUMENTS | | | | |
| 5,083,028A | 21 Jan. 1992 | Decossas, et al. | 250/390.03 | |
| Pub. No. 2005/0017185A1 | 27 Jan. 2005 | King | 250/370.05 (PCT/GB04/02805) | |
| 8,338,784 B2 | 25 Dec. 2012 | Kurakado, et al. | 250/336.2 | |
| 8,536,527 B2 | 2013 Sep. 17 | Morris, et al | 250/307 | |

| Number | Date | Author(s) | Information | Examiner |
|---|---|---|---|---|
| Pub. No. 2013/0015360A1 | 2013 Jan. 17 | Kobayashi, et al | 250/366 | |
| 4,421,985A | 1983 Dec. 20 | Billingsley, et al. | 250/353 | |
| 5,043,574 | 1991 Aug. 27 | Maier, et al | 250/251 | |
| INTERNATIONAL PATENT DOCUMENTS | | | | |
| DE102013006563A1 | 2013 Apr. 9 | Anmelder | https://patents.google.com/patent/ DE102013006563A1/en | |
| EP1944626A2 | 27 Jan. 2005 | Haslip et al. | https://patentimages.storage.googleapis.com/ d4/24/61/be09fec49c3570/EP1944626A2.pdf | |
| EP0228933A1 | 1985 Dec. 4 | Ruscev, et al. | https://patents.google.com/patent/ EP0228933A1/cn | |

OTHER PUBLICATIONS

J. Kasper, et al., Alfvénic velocity spikes and rotational flows in the near-Sun solar wind. *Nature* 576, 228-231 (2019).

R. Howard, et al., Near-Sun observations of an F-corona decrease and K-corona fine structure. *Nature* 576, 232-236 (2019).

S. Bale, et al., Highly structured slow solar wind emerging from an equatorial coronal hole. *Nature* 576, 237-242 (2019).

D. McComas, et al., Probing the energetic particle environment near the Sun. *Nature* 576, 223-227 (2019).

A. Corstanje, et al., Depth of shower maximum and mass composition of cosmic rays from 50 PeV to 2 EeV measured with the LOFAR radio telescope. *Phys. Rev. D* 103, 102006 (2021).

M. G. Aartsen, et al., Search for neutrinos from decaying dark matter with IceCube. *Eur. Phys. J. C* 78, 831 (2018).

Igor Ostrovskii, Direct detection of cosmic dark radiation by the crystal-star effect. *Proceedings of Meetings on Acoustics,* 34, 045007 (2018); doi: 10.1121/2.0000850.

Igor Ostrovskii, Direct detection of gravitating dark particles navitens by nonlinear effects in crystal vibrations and by particles track. *Proceedings of Meetings on Acoustics,* 36, 045006 (2019); doi: 10.1121/2.0001129.

Igor Ostrovskii, *Proceedings of Meetings on Acoustics,* Vol. 42, 045001 (2021); doi: 10.1121/2.0001361. (Submitted: 27 Dec. 2020, accepted: 27 Jan. 2021, Published Online: 22 Feb. 2021).

G. Fowels, G. Cassidy, *Analytical Mechanics,* 7th edn., Ch. 3. Thomson Brooks/Cole Publishing, (2005).

The invention claimed is:

1. An apparatus for detecting massive particles, locating sources of the massive particles, and harvesting energy of the massive particles, the apparatus comprising:
 a bench;
 a housing for blocking ambient electromagnetic disturbances and air pressure disturbances, the housing being mounted on the bench;
 a pendulum attached to the housing, the pendulum comprising:
  a bob configured to be hit by the massive particles;
 a three-dimensional rotation fixture configured to rotate the bench; and
 means for measuring changes of a position of the bob and changes of physical characteristics of the bob.

2. A method of using the apparatus of claim 1, the method comprising the steps of:
 measuring the changes of the position of the bob and the changes of the physical characteristics of the bob;
 determining presence of the massive particles when a measured vibrational amplitude of the bob is larger than a predetermined noise threshold amplitude;
 changing an orientation of the bob by adjusting the three-dimensional rotation fixture; and
 determining azimuth angles of the sources of the massive particles corresponding to azimuths of maxima vibrational amplitudes within a plurality of sets of measured data at different orientations of the bob.

3. A method of using the apparatus of claim 1,
 wherein the apparatus further comprises:
  a coil positioned under the bob;
 wherein the bob comprises:
  a magnet positioned at a tip of the bob; and
 wherein the method comprises the step of
  generating electric current when the massive particles hit the bob.

4. The apparatus of claim 1, wherein the bob is made of a crystal, condensed material.

5. The apparatus of claim 1, wherein the bob is made of a crystalline quartz material.

6. The apparatus of claim 5, wherein an axis of the bob is aligned with a direction of a crystallographic quartz axis of the crystalline quartz material.

7. The apparatus of claim 1, wherein the massive particles hitting the bob causes atoms of the bob to vibrate at a main driven frequency less than 10 hertz.

8. The apparatus of claim 1 further comprising
 a base plate below the three-dimensional rotation fixture;
 a supporting pedestal below the base plate; and
 a vibration insulation material between the base plate and the supporting pedestal.

* * * * *